United States Patent
Petruschka et al.

(10) Patent No.: US 6,678,787 B2
(45) Date of Patent: Jan. 13, 2004

(54) DASD-FREE NON-VOLATILE UPDATES

(75) Inventors: Yael Petruschka, Haifa (IL); Erez Webman, Petach Tikva (IL); Yoram Novick, Haifa (IL); Tal Sivan, Yokneam Llit (IL)

(73) Assignee: International Business Machines Corporation, Armonk, NY (US)

(*) Notice: Subject to any disclaimer, the term of this patent is extended or adjusted under 35 U.S.C. 154(b) by 270 days.

(21) Appl. No.: 09/745,328

(22) Filed: Dec. 21, 2000

(65) Prior Publication Data

US 2002/0083263 A1 Jun. 27, 2002

(51) Int. Cl.$^7$ ............................................ G06F 12/00
(52) U.S. Cl. ...................... 711/112; 711/162; 707/202; 714/6
(58) Field of Search ................................. 711/112, 113, 711/111, 114, 161, 162; 707/202, 203, 204; 714/6, 18, 20

(56) References Cited

U.S. PATENT DOCUMENTS

| | | | | |
|---|---|---|---|---|
| 5,269,019 A | * | 12/1993 | Peterson et al. | 707/205 |
| 5,524,205 A | * | 6/1996 | Lomet et al. | 714/16 |
| 5,581,724 A | * | 12/1996 | Belsan et al. | 711/114 |
| 5,675,769 A | * | 10/1997 | Ruff et al. | 711/173 |
| 5,682,513 A | * | 10/1997 | Candelaria et al. | 711/113 |
| 6,088,778 A | * | 7/2000 | Ruff et al. | 711/713 |
| 6,269,382 B1 | * | 7/2001 | Cabrera et al. | 707/204 |
| 6,463,501 B1 | * | 10/2002 | Kern et al. | 711/100 |

OTHER PUBLICATIONS

Mohan et al., "Data Base Recovery in Shared Disks and Client–Server Architechtures", ©1992 IEEE, p. 310–317.*
Panagos et al., "Client–Based Logging for High Performance Distributed Architectures", ©1996 IEEE, p. 344–351.*
Rahm, "Performance Evaluation of Extended Storage Architectures for Transaction Processing", ©1992 ACM, p. 308–317.*

* cited by examiner

*Primary Examiner*—Donald Sparks
*Assistant Examiner*—Brian R. Peugh
(74) *Attorney, Agent, or Firm*—Baker Botts L.L.P.

(57) ABSTRACT

System for the storage and maintenance of data sets updates in a storage subsystem, that comprises direct access storage device(s) that serves as the main storage of the storage subsystem and on which the data sets are originally stored; a Cache memory storage device that enables fast interaction with the storage subsystem, on which a copy of the data sets is stored; a non-volatile storage device partitioned into a plurality of fixed size non-volatile memory pages. The system employs an update process, in which the changes to the data sets are applied to the data set copy stored on the Cache memory device; a journal of the changes that are being made to the data sets stored on the Cache memory device, utilizing the non-volatile memory pages to store update records reflecting the changes in the data sets; a reconstruction process in which the data sets are reconstructed utilizing the update records stored on the non-volatile memory pages, and the data sets stored on the direct access storage device; and a process for freeing arbitrary non-volatile pages from their prior association with data sets that are stored in the Cache memory.

5 Claims, 3 Drawing Sheets

DASD-FREE NON-VOLATILE UPDATES

FIELD OF THE INVENTION

The present invention relates to the managing of data sets stored within storage subsystems. More particularly, the invention relates to a method and apparatus for managing update information of data sets stored in a storage subsystem.

BACKGROUND OF THE INVENTION

A Storage Subsystem (SS) typically consists of a plurality of Direct Access Storage Devices (DASD), a fast Random Access Memory (RAM) device, also known as "Cache memory", and a Non-Volatile RAM (NVRAM). A magnetic storage media (e.g., hard disks, tapes, etc.) usually implements the DASDs, and this is where the data is eventually stored. The Cache memory device is utilized to enable fast I/O interactions, with Hosts and/or other devices, to take place. Therefore, it is usually implemented from fast RAM devices (e.g., SRAM), which are volatile. The NVRAM is usually implemented by a battery backed-up RAM, or by types of flash memories, and their functioning and management is of critical importance for the SS operation, as will be explained hereinafter.

Hard Disk Drives (HDD) are commonly utilized as the main storage device for DASD implementations. HDDs are relatively cheap and non-volatile storage devices, which have a substantially large capacity. These devices are usually comprised of circular magnetic mediums (disks) and read/write magnetic heads. To enable the magnetic heads to efficiently locate data stored on the HDD's disks, the stored data is organized in Tracks, Sectors and Clusters. Each disk is divided into a number of concentric circles, so-called Tracks. The HDDs disks are also partitioned into "pie slices", known as Sectors. Each of the disk's Sectors consists of Clusters, comprising the smallest storage unit of data on HDD's disk (typically 256 or 512 Bytes in length).

The HDD disks rotate continuously, and in order to reach a specific location on the disk, the magnetic heads are located over the respective disk Track, where they wait for the required Sector and Cluster on the rotating disk. From this type of operation the HDD's characteristics are derived, these being the latency time, and bandwidth. The latency time is derived from the velocity at which the magnetic heads may be moved from one Track to another. The bandwidth is derived from the circular velocity of the HDD's disks, and actually indicates the read/write rate (Bytes per second), once the magnetic heads are properly located.

Another important factor, which influences the operation of HDDs, is that data may be read/write only at the Cluster level. This means that in order to read/write a single Byte, the operation is performed on the entire Cluster, in which this Byte is located. The limitation imposed by the latency time, Bandwidth and the Cluster read/write operation makes it very attractive to perform HDD transactions in the Track level. The performance is substantially improved when the read/write operation of consecutive disk Clusters is performed.

The limited Bandwidth and the latency time impose low-resolution operation of the HDDs, and therefore the main data stream is directed to/from the Cache device to reduce the access to the DASDs. In general, the Cache memory is utilized as a temporary storage device for incoming and outgoing data. In this way, the data is written to the Cache device at first, so that the DASD's I/O transactions are actually performed between an I/O device and a fast Cache memory device. This allows an efficient HDD operation, and on the other hand, I/O transactions are performed substantially faster.

However, the Cache memory is volatile, and therefore vulnerable to power-and other failures (failures that may result in the loss of the Cache memory content). Therefore, usually, a copy of the Cache content is stored on the NVRAM, and the data sets on the DASDs are updated on the base of Least Recently Used (LRU) policies. The NVRAMs, on the other hand, are relatively expensive, and therefore they are usually small in terms of memory size, generally too small to hold all the modified data sets required. To solve the foregoing problem, special algorithms (e.g., LRU algorithms) are utilized to enable an efficient Cache management.

This is particularly relevant when dealing with Control Data (CD). These data are utilized to manage and control the SS operations. CD usually has a special structure which enables efficient encoding. For example, bit map images are often utilized to designate changes made to the copies of data sets stored in different locations. In this way, for each data set there is a corresponding bit, in the bit map image, such that when changes are applied to the content of this data set, the state of the bit is altered to designate that the copies are no longer even. Typically, the content of consecutive bits is changed, and changing a single bit is relatively rare. The updates of this type of CD may be easily encoded to a structure consisting of the change (i.e., 0→1 or 1←0) and the range of bits that changed their state.

The CD Sets (CDS) are preferably stored on the DASDs. Since changes are frequently being made to fractions of the CDSs, they are copied to the Cache memory, and modified on the DASD in an LRU base. The copy of the CDS on the Cache memory may be updated frequently, but this copy of updated CDS is vulnerable and volatile. Therefore, any change applied to the CDS stored on the Cache memory is efficiently encoded into an update record, which is then stored in the NVRAM. As previously discussed, the size of the NVRAM is relatively small, and therefore it cannot contain all the required update information. This problem is typically resolved by applying the modified information, stored in the Cache memory, to the appropriate CDS stored on the DASD, and thereby, freeing NVRAM memory space and actually updating the original CDSs.

It should be clear that by applying the update information to the CDSs on the DASD, it is meant that the updated CDSs stored on the Cache memory are copied to the appropriate DASD tracks. Thereby the CDSs track on the DASD becomes an up-to-date CDSs copy, and the appropriate updates that are stored on the NVRAM may be removed and reused for storage of further update records.

To enable automatic recovery from a lost or damaged CDS, a journal of CDSs changes is maintained. The journal data set (hereinafter referred to as the "journal of changes") contains each change (in encoded format) made to the CDSs since the last time the CDSs was successfully copied from the Cache memory to their DASD tracks. In the event of losing the content of the Cache memory, the CDSs are recovered by applying the changes reflected by the update records that are stored in the journal of changes stored (on the NVRAM) with the copy of the CDSs maintained on the DASDs.

The Track Set Manager (TSM) implementation in the IBMs Enterprise Storage Server (ESS), utilizes a similar method, i.e., maintaining a journal of changes. In the ESS's TSM the CDSs are stored in the Cache memory, where they are subject to rapid changes. The changes that are applied to the CDS stored in the Cache memory are encoded and stored on an NVRAM buffer. The TSM implementation divides the NVRAM partition into two distinct partitions, to enable an efficient management of the update information.

FIG. 1 schematically illustrates the method utilized in the ESS's TSM. The CDS is maintained in two different locations on disks 100 and 101. A Checkpoint process alternately writes CDS from the Cache memory, to one of the DASD's copies (illustrated in lines 103 and 104), 100 and 101. All of the updates to a CDS are written to both of the disk Tracks 100 and 101, over a period of two Checkpoint processes. The NVRAM buffer 112 is utilized to hold the encoded records of the updates that are applied to the copy of the CDSs on the Cache memory. As mentioned hereinbefore, the NVRAM buffer, 112, is partitioned into two distinct sections, 113 and 114. This structure enables the concurrent operations of storing update information, and freeing NVRAM space (i.e., writing updated CDSs from the Cache memory to the DASD tracks).

More precisely, this type of operation allows the storage of new update records to the NVRAM, and at the same time enables updating the CDSs copy on the DASD tracks, such that while new update records are being stored on one NVRAM partition, the content of the other partition is emptied. It should be obvious that the NVRAM partition may be cleared only when the corresponding CDSs in the Cache memory (i.e., the modified CDSs) are copied to the DASD tracks. In other words, in order to erase update records (i.e., the encoded changes) the modified CDSs to which update records relate, must be copied to the original tracks on the DASD (i.e., where the CDSs are originally stored). Otherwise, the modifications may be permanently lost in the event of system failures.

For example, in FIG. 1, an NVRAM section 114 is holding the recent CDS updates. When the NVRAM partition 114 is filled, the second partition 113, is utilized to hold further CDS updates while the update records on the full partition 114 are cleared by dumping the CDSs (from the Cache memory), associated with its update records, to their DASD tracks. If an NVRAM partition is filled before the other partition is cleared, the filled NVRAM partition is copied temporarily to a special disk Track 115. This enables reuse of the NVRAM buffer for storing new updates, and reconstructing the modified CDSs utilizing the update records stored in the special Track, 115.

A recovery process 130 is performed to reconstruct the CDSs, in case of faulty erasing of the Cache memory content. When the recovery is performed, the CDSs are reconstructed from a valid version of one of the disk locations, 100 or 101, that are stored on the DASD, along with the update records that are stored on the NVRAM partitions, 113 and/or 114, and the update records stored on the special disk Track 115.

The method of the TSM allows continuous storage of update records to the NVRAM buffer. However, the Checkpoint and the recovery processes are relatively long and cumbersome. When a checkpoint process is completed, a partition of the NVRAM buffer is cleared from all of its update records. This means that all the CDSs on the Cache memory that are associated with update records stored in one partition must be dumped (from Cache memory to DASD tracks) within a Checkpoint period to enable clearing the partition before the other partition is refilled.

However, it is not always possible to meet this requirement, and therefore the special DASD track (115) is utilized to store update records, if an NVRAM partition is filled before a Checkpoint process is concluded. The CDSs reconstruction utilizes three different storage locations, and involves determining which of the disk location is the valid one for recovery. As a result, the update and recovery processes result in a complex and relatively long operation. Moreover, in the method of the TSM, the sequence of CDS tracks updates, applied to the DASD, strongly depends on the order of update records in the NVRAM partitions, and therefore the update of the DASD tracks is, in general, not continuous.

The methods described above have not yet provided satisfactory solutions to the problems of the storage, management, and recovery of CDSs of DASDs in storage subsystems.

It is therefore an object of the present invention to provide a method and apparatus for fast and reliable recovery of the CDSs in a storage subsystem in the event of system failures, and for an efficient management of the storage devices.

It is another object of the present invention to provide a method and apparatus for fast and efficient storage and update of CDS in a storage subsystem, which allows an independent update of CDS tracks on DASDs and an efficient exploitation of the NVRAM memory space.

It is a further object of the present invention to provide a method and apparatus for a fast and efficient CDS update process in a storage subsystem, utilizing a small update information record.

Other objects and advantages of the invention will become apparent as the description proceeds.

SUMMARY OF THE INVENTION

The following terms are defined as follows:

HOST: any computer that has full two-way access to other computers on a communication network.

I/O device: a device that transfers data to or from a computerized system.

In one aspect, the present invention is directed to a system for the storage and maintenance of data sets updates in a storage subsystem, comprising one or more direct access storage device(s) that serves as the main storage of the storage subsystem and on which the data sets are originally stored. The system further comprises a Cache memory storage device that enables fast interaction with the storage subsystem, and on which a copy of the data sets is stored. The system also comprises a non-volatile storage device partitioned into a plurality of fixed size non-volatile memory pages, and an update process in which the changes to the data sets are applied to the data set copy stored on the Cache memory device. A journal of the changes that are being made to the data sets stored on the Cache memory device is maintained, utilizing the non-volatile memory pages to store update records reflecting the changes in the data sets. A reconstruction process is utilized to reconstruct the data sets, utilizing the update records stored on the non-volatile memory pages, and the data sets stored on the direct access storage device. The system further comprises a process for freeing arbitrary non-volatile pages from their prior association with data sets that are stored in the Cache memory.

Optionally, the Journal of data set changes comprises dynamically allocating and associating free empty non-volatile pages for the storage of update records of data sets, which are not already associated with any non-volatile pages. The Journal of data set changes may further comprise applying updates to the copy of a data set stored in the Cache memory, and determining whether the data set that has been updated on the Cache memory device is associated with one of the journal's non-volatile memory pages and if so, determining whether the associated non-volatile memory page is full. If it is determined that the associated non-volatile memory page is full, the original copy of the data set that is stored on the direct access storage device is updated, the content of the associated non-volatile memory page is cleared, and the data set's update record is stored on the non-volatile memory page. In response to a determination that the associated non-volatile memory page is not full, the data set update information is stored on the non-volatile memory page. If it is determined that the data set is not associated with a non-volatile memory page, then determining whether there is a free non-volatile memory page available and if so, associating the non-volatile memory page with the data set, and storing the update information on the non-volatile memory page. When it is determined that none of the non-volatile memory pages is available, the content of an arbitrary data set is dumped from the Cache memory into the direct access memory device, the non-volatile memory page associated with the arbitrary data set is cleared, and then associated with the data set for storing the update information on it.

The reconstruction process optionally comprises updating the original data sets that are stored on the direct access memory device by applying the update information stored on the corresponding non-volatile pages with which they are associated.

Optionally, the process for freeing arbitrary non-volatile pages from their prior association with data sets that are stored in the Cache memory may further comprise arbitrarily choosing a non-volatile page, dumping the content of the CDS associated with the non-volatile page from the Cache memory into the appropriate DASD Track, and clearing and freeing the non-volatile page from its prior association.

The system may further comprise encoding means utilized to encode the changes applied to each of the data sets to obtain an update record to be stored in the non-volatile page associated with the data set, wherein the update record reflects the changes and according to which the updated data set may be reconstructed utilizing its copy in the direct access storage device.

DETAILED DESCRIPTION OF PREFERRED EMBODIMENTS

Storage Subsystems (SS) usually comprise some DASDs as the main storage devices. Typically, a Cache memory is utilized to enable fast I/O operations to take place, and to enable writing a plurality of disk Clusters over a relatively small number of write operations. The Cache memory is comparatively large in size, but volatile, and therefore an NVRAM is utilized to store the updates that are made to the data sets stored on the Cache memory. The NVRAM is typically small in size, and therefore, the updated data sets stored on the Cache memory are frequently copied to the DASDs to enable reuse of the NVRAM.

A method for a fast and efficient update of data sets stored in an SS is disclosed herein. Although the following description refers to the management of CDSs, it should be clear that the method disclosed hereby is applicable to any kind of data set stored in an SS.

Figure 1:
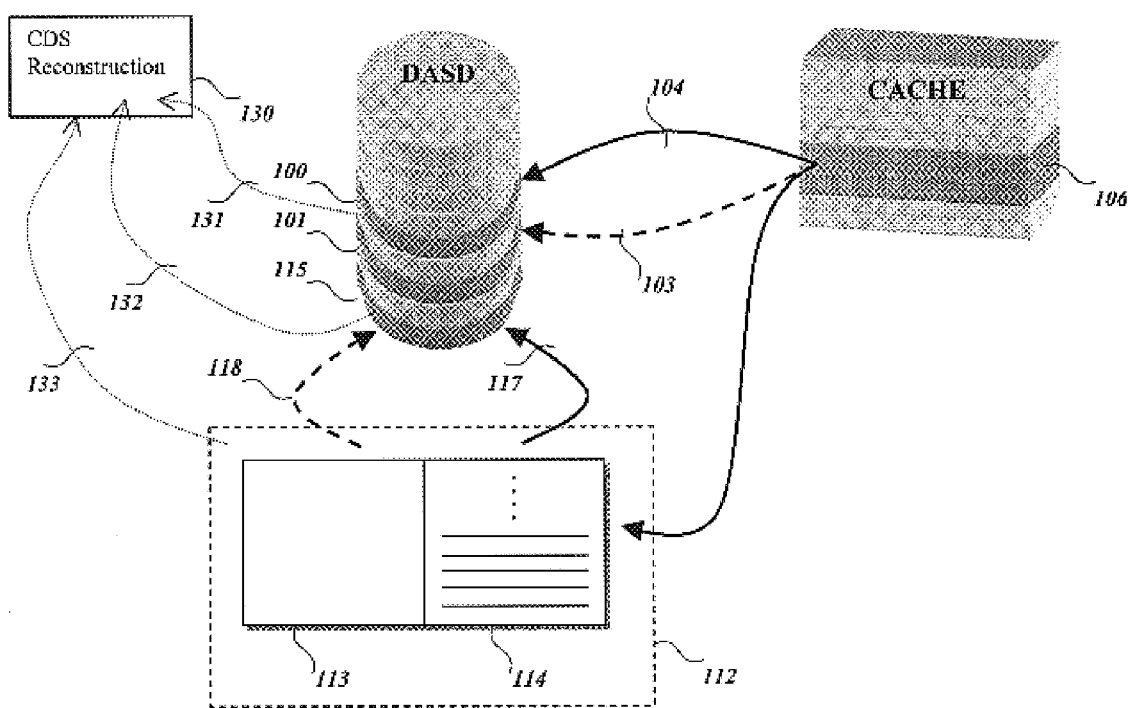
FIG. 1 schematically illustrates the method utilized by the ESS's TSM to manage and recover CDS updates.
Figure 2:
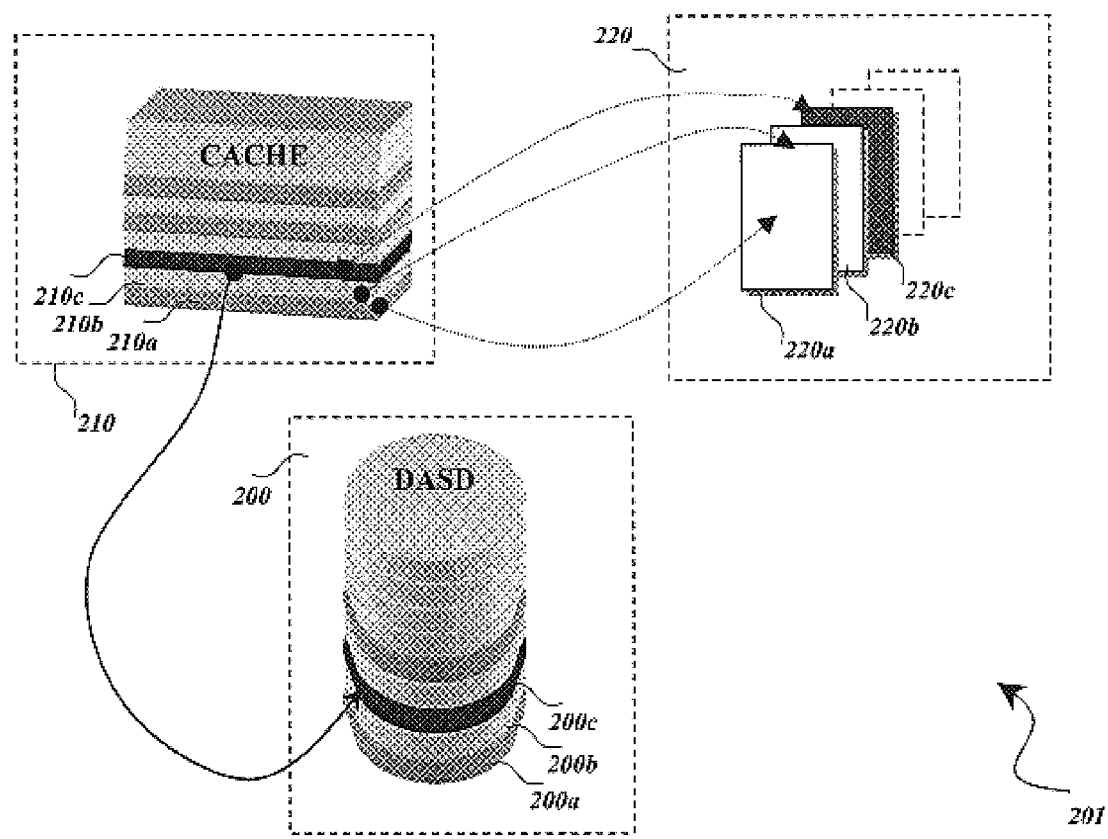
FIG. 2 schematically illustrates a preferred embodiment of the invention, for the management of CDS update records, and for the CDSs' recovery.

FIG. 2 schematically illustrates a CDS updating method, according to a preferred embodiment of the invention. The SS 201 consists of a DASD 200, a Cache memory 210, and an NVRAM 220. The CDSs stored in the DASD Tracks $200_a$, $200_b$, and $200_c$, are copied to the Cache buffers $210_a$, $210_b$, and $210_c$ (hereinafter referred to as "Cache tracks"), to enable efficient management of those data sets. The CDSs stored on the Cache Tracks $210_a$, $210_b$, and $210_c$, and the original CDSs which are maintained in the DASD Tracks $200_a$, $200_b$, and $200_c$, are completely identical at first. But as the operation proceeds, updates are applied to the copy of the CDSs stored on the Cache memory 210.

The NVRAM 220 in FIG. 2 is organized in pages $220_a$, $220_b$, and $220_c$, of fixed size (e.g., 512 Bytes). Each of the NVRAM pages is associated with one Cache Track at any moment in time. A journal of the CDS updates, which occurs during the system's operation, is immediately stored on the appropriate NVRAM pages, in the form of an update record which contains the information describing the change. To improve efficiency, and for a better exploitation of the NVRAM space, the changes in the CDSs are encoded to obtain small and compact update records. Since the number of pages is much smaller than the number of CDSs, the page association is dynamically updated according to the system requirements, at any given moment.

When a journal page is filled, the associated updated CDS, which is stored in Cache memory, 210, is dumped to the appropriate DASD Track. For example, in FIG. 2, if the NVRAM page 220c is filled, the associated CDS $210_c$ in the Cache memory, 210, is dumped to the DASD Track $200_c$. This allows for an instantaneous concurrent update of independent NVRAM pages, and in addition, the dumping of updated CDSs, from the Cache memory, permits clearing the independent NVRAM page, and dynamically associates it with a new CDS, if required.

The method of the invention exemplified hereinabove by FIG. 2 is illustrated with the DASD 200. However, it should be clear that the method of the invention is compatible with systems consisting of a plurality of DASDs. In fact, in a typical SS, a number of DASDs are utilized as main storage devices, though the SS actually appears to outer devices as consisting of a single DASD.

Figure 3:
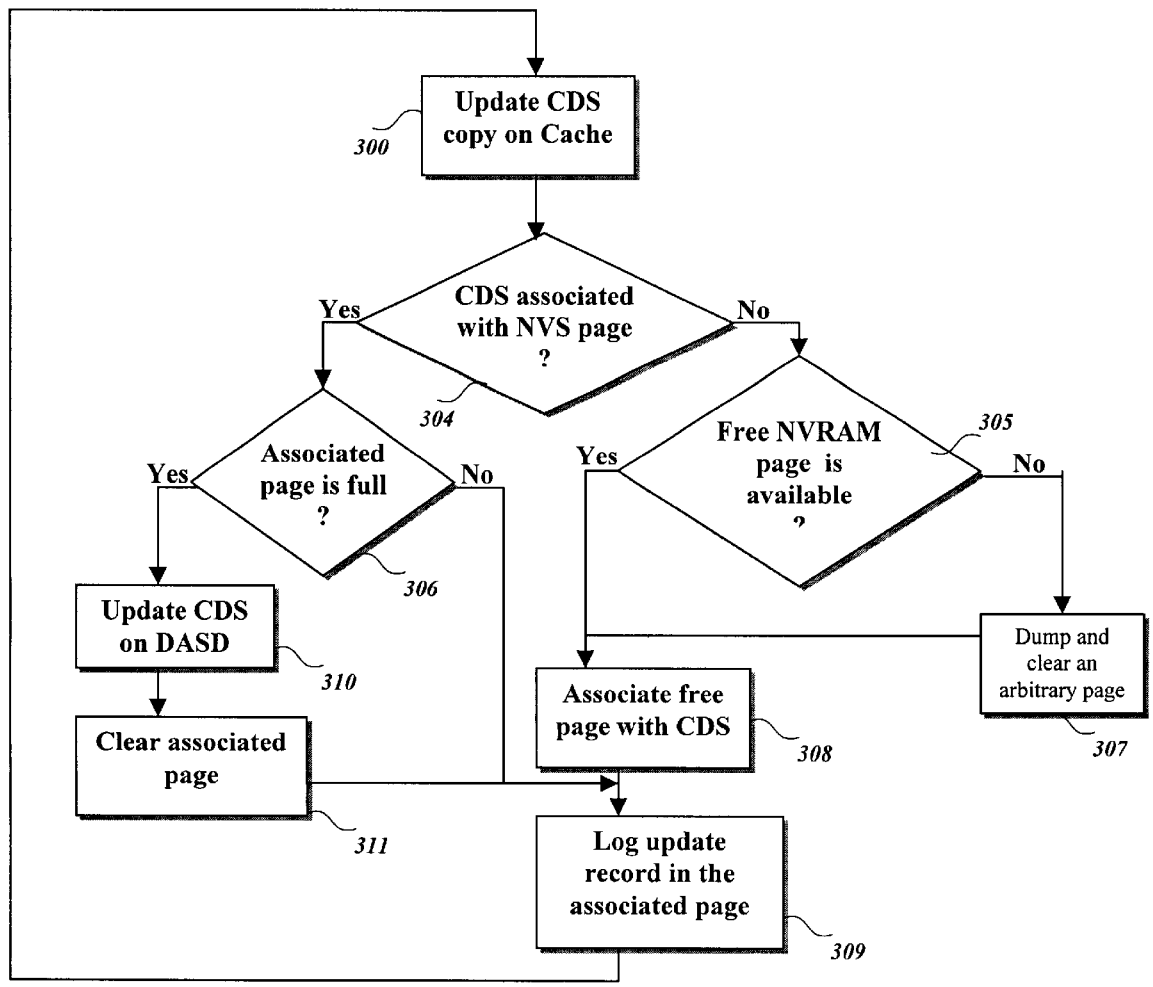
FIG. 3 is a flow chart illustrating a preferred embodiment of the invention for managing CDSs in a storage subsystem.

The sequence of operations involved in the process of updating and dumping CDSs, according to a preferred embodiment of the invention, is schematically illustrated in the flow chart of FIG. 3. When a CDS update is performed, the corresponding copy of the CDS in the Cache memory is modified, as illustrated in step 300. The operation continues in step 304, where it is determined whether there is an NVRAM page associated with the CDS modified in the Cache memory.

Assuming that there is an NVRAM page associated with the updated CDS, the operation proceeds as the control passes to block 306, where it is determined whether the associated page is full. If said associated NVRAM page is full, the CDS Track on the DASD is updated with the CDS track stored on the Cache memory, in step 310, and in step 311 the NVRAM page is cleared for storing further update records. Once the NVRAM page is cleared, it is free for logging new update records, and after completing the log operation, the control returns to step 300. It should be clear that the CDS update operation is actually performed by copying the modified Track (CDS) from the Cache memory to the DASD.

The update record is logged into the associated page in step 309. This step is performed immediately after the clearing of an NVRAM page, in step 311; or, if it is determined in steps 304 and 306 that there is a page associated with the updated CDS, and that this page is not filled.

In the event that there is no NVRAM page associated with the modified CDS, the control is passed from step 304 to step 305, whereby it is determined whether there is a free page available that may be associated with the said CDS. If there is a free page in the NVRAM buffer, then it is associated with the updated CDS in step 308. On the contrary, if all the NVRAM pages are already associated with CDSs, an arbitrary page is selected, in step 307, and the CDS associated with it is dumped from the Cache memory to the appropriate CDS Track on the DASD device. This arbitrary page is then cleared and freed (from associations), and in step 308 it is associated with a CDS update. After it is associated, the update record is logged into this freed NVRAM page, as discussed hereinabove.

In this fashion, a modified CDS is dumped to the the appropriate DASD Track when an associated NVRAM page is filled, or if all the NVRAM pages are associated and a clear page is required. As a result, the time during which the DASD is occupied storing CDS update information is substantially reduced, and the updates are performed more efficiently and quickly. Moreover, the recovery process is substantially simplified, and is performed much faster, as will be explained hereinafter.

During the recovery process, each CDS, which is associated with a non-empty NVRAM page, is provided with an ordered list of update records that describes the change that might not be reflected in the disk image. The DASD Track image can now be reconstructed from the image on the DASD and from the update records' information.

In order to increase the number of free NVRAM pages, available for logging update records, at any given time, a background "cleaning" process is utilized. The background "cleaning" process selects NVRAM pages according to a "least recently used" policy. When such a page is chosen, the content of the corresponding CDS (the CDS associated with this NVRAM page) in the Cache memory is dumped into the appropriate DASD Track. The selected NVRAM page is then cleared and freed from its prior association, so that it may be reused for future association with modified CDSs.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A process for the storage and maintenance of data sets that are being frequently updated in a storage subsystem, comprising:

a) providing one or more direct access storage device(s) that serves as the main storage of the storage subsystem and on which said data sets are originally stored;

b) providing a Cache memory storage device that enables fast interaction with the storage subsystem, on which a copy of said data sets is stored;

c) providing a NVRAM partitioned into a plurality of fixed size non-volatile memory pages;

d) applying changes to said data sets copy stored on said Cache memory device;

e) maintaining a journal of said changes that are being made to said data sets copy stored on said Cache memory device, wherein said non-volatile memory pages are utilized to store update records reflecting said changes in said data sets copy;

f) reconstructing the data sets utilizing said update records stored on the non-volatile memory pages, and storing the data sets on the direct access storage device; and g) freeing arbitrary non-volatile pages from their prior association with data sets that are stored in the Cache memory.

2. A process according to claim 1, in which the step of mantaining said journal of data set changes further comprises dynamically allocating and associating free empty non-volatile pages for the storage of update records of data sets which are not already associated with any non-volatile pages, by performing the following steps:

a) applying updates to the copy of a data set stored in the Cache memory, and determining whether said data set updated on the Cache memory device is associated with one of the journal's non-volatile memory pages and if so, determining whether said associated non-volatile memory page is full;

a.1) in response to a determination that said associated non-volatile memory page is full, updating the original copy of said data set that is stored on the direct access storage device(s), clearing the content of said associated non-volatile memory page, and storing the update record of said data set on said non-volatile memory page;

a.2) in response to a determination that said associated non-volatile memory page is not full, storing said update record on said non-volatile memory page;

b) in response to a determination that said data set is not associated with a non-volatile memory page, determining whether there is a free non-volatile memory page available and if so, associating said non-volatile memory page with said data set, and storing said update record on said non-volatile memory page; and c) in response to a determination that none of the non-volatile memory pages is available, dumping from Cache memory the content of a data set associated with an arbitrary non-volatile page into the direct access storage device(s), clearing said non-volatile memory page, associating said non-volatile memory page with said data set, and storing said update record on said non-volatile memory page.

3. A process according to claim 1, in which the reconstruction step further comprises updating the original data sets stored on the direct access storage device(s) by applying the update records stored on the corresponding non-volatile pages with which they are associated.

4. A process according to claim 1, further comprising the changes applied to each of said data sets to obtain an update record to be stored in the non-volatile page associated with said data set, where said update record reflects said changes and according to which the updated data set may be reconstructed utilizing its copy in the direct access storage device(s).

5. A process for freeing arbitrary non-volatile pages from their prior association with data sets stored in a Cache memory storage device comprising arbitrarily choosing a non-volatile page, dumping the content of the data set associated with said non-volatile page from said Cache memory into an appropriate direct access storage device(s) Track, and clearing and freeing said non-volatile page from its prior association, wherein said data sets are stored on one or more direct access storage device(s), and wherein said non-volatile pages are partitions of a NVRAM used for storing update records reflecting the changes applied by an update process to copies of said data sets that are stored on said Cache memory storage device, whenever required said update records are used by a reconstruction process to reconstruct said data sets stored in said direct access storage device(s).

* * * * *